United States Patent [19]

Brindöpke et al.

[11] Patent Number: 4,882,391

[45] Date of Patent: Nov. 21, 1989

[54] POLYMERS CONTAINING AMINO GROUPS, THEIR PREPARATION AND THEIR USE

[75] Inventors: Gerhard Brindöpke, Frankfurt am Main; Michael Hönel, Mainz, both of Fed. Rep. of Germany

[73] Assignee: Hoechst AG, Fed. Rep. of Germany

[21] Appl. No.: 136,870

[22] Filed: Dec. 22, 1987

[30] Foreign Application Priority Data

Dec. 24, 1986 [DE] Fed. Rep. of Germany ....... 3644373

[51] Int. Cl.$^4$ ................................................. C08F 8/32
[52] U.S. Cl. ............................. 525/327.2; 525/327.3; 525/381; 525/382
[58] Field of Search ........................... 525/327.2, 327.9

[56] References Cited

U.S. PATENT DOCUMENTS

| | | | |
|---|---|---|---|
| 2,877,215 | 3/1959 | Fang | 525/327.2 |
| 3,084,140 | 4/1963 | Gurgiolo et al. | 525/461 |
| 3,271,377 | 9/1966 | Mantell et al. | 525/327.2 |
| 3,969,323 | 7/1976 | Furrer et al. | 525/327.2 |
| 4,758,615 | 7/1988 | Engel et al. | 524/198 |

*Primary Examiner*—Joseph L. Schofer
*Assistant Examiner*—Bernard Lipman
*Attorney, Agent, or Firm*—Bierman and Muserlian

[57] ABSTRACT

Non-crosslinked reaction products of compounds (A) which contain structural units carrying 1,3-dioxolan-2-one groups in random distribution and compounds (B) which contain at least one primary aliphatic or cycloaliphatic amino group and additionally at least one further basic amino group.

These reaction products are suitable, if appropriate together with conventional curing agents, especially as binders for coatings, above all electrodip coatings.

11 Claims, No Drawings

POLYMERS CONTAINING AMINO GROUPS, THEIR PREPARATION AND THEIR USE

Curable polymers containing amino groups are known. They can be obtained, for example, by copolymerization of aminoalkyl esters of unsaturated carboxylic acids (J. Coat. Techn. 54, (1982) pages 33 to 41). The aminoalkyl esters are, however, not readily accessible and, in the case of the products with primary and secondary amino groups, are not very stable on storage. Only aminoalkyl esters containing tertiary amino groups are therefore obtainable.

Copolymers containing amino groups can also be prepared by reacting copolymers containing epoxide groups with primary or secondary amines (cf. the above literature reference and German Offenlegungsschrift 3,436,346). This process is, however, not very selective and gives a mixture of products alkylated in different ways.

For a selective reaction, it is necessary to use an excess of amine, which must be removed by distillation after the end of the reaction. However, products with only secondary amino groups cannot be prepared by this procedure. Polymers with defined primary amino groups can be prepared by hydrolysis of isocyanate-containing copolymers (German Offenlegungsschrift 3,229,047). This process has the fundamental disadvantage that a part of the built-up polymer is degraded again by the hydrolysis reaction.

Of industrial interest and value are those polymers which do not contain any tertiary amino groups, since these groups remain unchanged in the coating film after a conventional curing reaction for coatings and, due to their basicity, accelerate the degradation of the coating, especially under the action of the weather or an acid.

In Soviet Patent No. 413,824, in German Offenlegungsschriften No. 3,617,705 and 3,624,454 and in Japanese Published Application 72/202,318, reactions of cyclic carbonates with primary aliphatic amines are described, non-basic urethanes being formed. However, the cyclic carbonates used are as a rule only bifunctional and are derived from glycidyl ethers which contain phenol ethers or glycol ethers as the base structures and have only unsatisfactory resistances to weathering influences.

It was therefore the object of the present invention to provide copolymers which carry amino groups and contain defined quantities of primary and/or secondary and/or tertiary amino groups, without the introduction of these amino groups requiring a hydrolysis reaction, and which allow cured coating films of adequate resistance especially to weathering influences and the action of acid to be obtained.

The present invention therefore relates to non-crosslinked reaction products of compounds (A) which contain structural units (a) carrying 1,3-dioxolan-2-one groups in random distribution, and compounds (B) which contain at least one primary aliphatic or cycloaliphatic amino group and additionally at least one further basic amino group.

The invention also relates to the use of these reaction products as a constituent especially of coatings, above all electrodip coatings.

The term "non-crosslinked" is intended to mean here that the reaction products according to the invention are soluble in at least one organic solvent, giving a clear solution.

The structural units (a), containing 1,3-dioxolan-2-one groups, of the compound (A) are preferably those of the general formula (I)

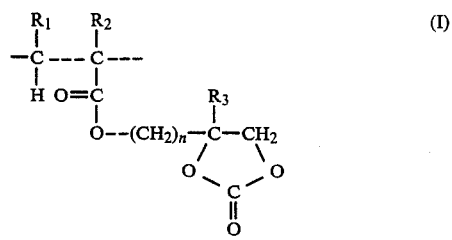

in which n is a number from 1 to 6, preferably 1, $R_1$ is H, alkyl having 1 to 10 carbon atoms, preferably 1 to 6 carbon atoms, or COOR" (R"=alkyl as above), $R_2$ is, independently thereof, H or alkyl as above and $R_3$ is H, methyl or ethyl. Typical representatives thereof are (2-oxo-1,3-dioxolan-4-yl)-methyl acrylate, (2-oxo-1,3-dioxolan-4-yl)-methyl methacrylate, (2-oxo-1,3-dioxolan-4-yl)-methyl itaconate and (2-oxo-1,3-dioxolan-4-yl)methyl maleate.

The quantity of the structural units (a) is in general 1 to 99% by weight, preferably 2 to 80% by weight and especially 5 to 60% by weight, each relative to compound (A). These structural units are in random distribution along the molecular chain, the term "random" being intended also to include a block distribution.

In addition, compound (A) also contains further structural units (b) in total quantities of 99 to 1% by weight, preferably 95 to 20% by weight and especially 92 to 40% by weight (relative to (A)), which are derived from at least one of the following monomers:

($b_1$) olefins such as ethylene and propylene;
($b_2$) vinyl aromatic hydrocarbons such as preferably styrene or substituted styrenes, such as α-methylstyrene and p-methylstyrene;
($b_3$) esters, containing hydroxyl groups or glycidyl groups and having 1 to 18 carbon atoms in the alcohol radical, of an unsaturated mono- or dicarboxylic acid such as acrylic and methacrylic acid (=(meth)acrylic acid), fumaric acid, maleic acid or itaconic acid, (meth)acrylic acid being preferred. Examples thereof are esters of these acids with ethylene glycol, 1,2- or 1,3-propylene glycol, 1,4-butylene glycol, trimethylolpropane, glycerol and the like; and also reaction products of these acids with terminal epoxides such as, for example, hexene oxide or dodecene oxide, and reaction products of these acids with glycidyl esters, preferably of α-branched, saturated aliphatic monocarboxylic acids having 8–14 carbon atoms, such as, for example, (R)Cardura E 10 (glycidyl ester of "versatic acid"). If corresponding esters of unsaturated dicarboxylic acids are used, these should contain only one C=C double bond. Hydroxyethyl (meth)acrylate or hydroxypropyl (meth)acrylate are particularly preferred. Special elastic properties are obtainable when a reaction product of hydroxyalkyl (meth)acrylate with ε-carprolactone is used.

($b_4$) esters, amides or nitriles of unsaturated monomer di-carboxylic acids. The esters are here preferred. The acids used are the same as mentioned above under ($b_3$). The alcohol component in the esters contains in general 1 to 18 and preferably 1 to 13 carbon atoms. Examples of these are: methyl, ethyl, butyl, 2-ethylhexyl, lauryl or stearyl esters of (meth)acrylic acid. Fatty alcohols, cyclic alcohols, monoalkyl ethers of ethylene glycols or propylene glycols as well as versatic alcohol are also suitable as the alcohol component.

In addition, substituted and unsubstituted amides of these acids are also suitable. Substituted amides can be: mono- and di-alkylamides having 1–10 carbon atoms in the alkyl radical, etherified and unetherified hydroxyalkylamides having 1–6 carbon atoms in the alkyl moiety and ether moiety, and mono- and di-alkylaminoalkylamides having 1–6 carbon atoms in the alkyl radical. The following may be mentioned concretely: (meth)acrylamide, N-methylol-(meth)acrylamide and corresponding ethers such as the methyl or butyl ether of N-methylol-(meth)acrylamide, hydroxyethyl- or hydroxypropyl -(meth)acrylamide, 2-t-butylaminoethylmethacrylamide and N,N-dimethylaminoethylmethacrylamide. (Meth)acrylonitrile may be mentioned as an example of a nitrile;

(b5) unsaturated esters of a preferably α-branched aliphatic, saturated monocarboxylic acid, for example vinyl esters of carboxylic acids having 2 to 20 and preferably 2 to 6 carbon atoms, such as vinyl acetate, vinyl propionate and vinyl linoleate. Preferably, however, these are vinyl esters of α-branched carboxylic acids having 8 to 14 carbon atoms, in particular α-monoalkane- or α-dialkanemonocarboxylic acids such as the so-called "versatic acids" (vinyl versatate);

(b6) vinyl compounds (other than vinyl esters) such as vinyl ethers, for example methyl vinyl ether, ethyl vinyl ether or alkyl vinyl ethers with alkyl radicals having 3 to 6 carbon atoms; and N-vinylpyrrolidone.

If the acrylate resin containing amino groups is to be used as the sole, self-crosslinking binder, monomers containing blocked isocyanate groups (b7) for the preparation of the compound (A) can also be introduced at the same time. As examples of copolymerizable monomers having blocked isocyanate groups, vinyl urethanes may be mentioned, which are formed by reacting vinyl isocyanate with customary blocking agents. Examples which will be mentioned here are: tert-butyl N-vinylcarbamate, cyclohexyl N-vinylcarbamate and the N-vinylcarbamic acid/ε-caprolactam adduct. However, such monomers can also be obtained by reacting half-blocked polyisocyanates with esters, containing hydroxyl groups, of unsaturated carboxylic acids. Such esters containing hydroxyl groups are, for example, those according to (b3) above. The half-blocked polyisocyanates are reaction products of the known polyisocyanates, such as toluene diisocyanate, isophorone diisocyanate etc., or of corresponding prepolymers with suitable blocking agents, only one of the isocyanate groups not being converted. The copolymerizable monomer is then obtained in a second step by reacting the free isocyanate group with the ester, containing hydroxyl groups, of the unsaturated acid. The converse procedure is also possible. However the reaction with the half-blocked isocyanates may also take place only after the polymerization.

Suitable blocking agents are aliphatic, cycloaliphatic or alkylaromatic (monohydric) alcohols, for example lower aliphatic alcohols such as methyl alcohol, ethyl alcohol, the various propyl alcohols, butyl alcohols and hexyl alcohols, heptyl alcohol, octyl alcohol, nonyl alcohol, decyl alcohol, and similar, including unsaturated alcohols, such as allyl alcohol, cycloaliphatic alcohols, such as cyclopentanol and cyclohexanol, alkylaromatic alcohols such as benzyl alcohol, methylbenzyl alcohol as well as p-methoxy- and p-nitro-benzyl alcohol and monoethers of glycols, such as ethylene glycol monoethyl ether or ethylene glycol monobutyl ether and similar ethers. Further blocking agents are ketoximes such as, for example, methyl ethyl ketone oxime, acetone oxime and longer-chain oximes having preferably up to 10 carbon atoms, such as methyl n-amyl ketoxime and dibutyl ketoxime, and also cyclohexanone oxime, phenols, CH-acidic compounds such as alkyl malonates, acetylacetone, acetoacetates and cyanoacetates each having 1 to 4 carbon atoms in the ester group, NH-acidic compounds such as caprolactam, imidazolines, triazoles, hydroxyamic acid esters and amino alcohols such as diethylethanolamine. Mixtures of these blocking agents are also possible.

With regard to the above monomers (b1) to (b6) or (b7), mixtures within the individual groups can also be used in each case.

The compounds (A) are polymers, the molecular weight $\overline{M}_w$ (weight average, determined by gel chromatography, polystyrene standard) is in general between 1,000 and 50,000, preferably between 3,000 and 30,000.

Typical representatives of the compounds (A) are those which contain the following structural units:

(2-oxo-1,3-dioxolan-4-yl)-methyl (meth)acrylate/2-hydroxyethyl (meth)acrylate/butyl (meth)acrylate/ethylhexyl (meth)acrylate;

(2-oxo-1,3-dioxolan-4-yl)-methyl (meth)acrylate/2-hydroxyethyl (meth)acrylate/butyl (meth)acrylate/ethylhexyl (meth)acrylate/styrene;

4-(2-oxo-1,3-dioxolan-4-yl)-methyl itaconate/2-hydroxyethyl (meth)acrylate/butyl (meth)acrylate/ethylhexyl (meth)acrylate;

4-(2-oxo-1,3-dioxolan-4-yl)-methyl itaconate/2-hydroxyethyl (meth)acrylate/butyl (meth)acrylate/ethylhexyl (meth)acrylate/styrene;

(2-oxo-1,3-dioxolan-4-yl)-methyl maleate/2-hydroxyethyl (meth)acrylate/butyl (meth)acrylate/ethylhexyl (meth)acrylate;

(2-oxo-1,3-dioxolan-4-yl)-methyl acrylate/1,4-butanediol monoacrylate/2-ethylhexyl acrylate/styrene;

(2-oxo-1,3-dioxolan-4-yl)-methyl methacrylate/2-hydroxypropyl methacrylate/methyl methacrylate/styrene;

(2-oxo-1,3-dioxolan-4-yl)-methyl methacrylate/lauryl methacrylate/2-ethoxyethyl methacrylate/styrene;

(2-oxo-1,3-dioxolan-4-yl)-methyl methacrylate/reaction product of Cadura E 10 and acrylic acid/styrene/methyl methacrylate/Hydroxyethyl methacrylate;

(2-oxo-1,3-dioxolan-4-yl)-methyl methacrylate/2-methoxyethyl acrylate/2-hydroxypropyl acrylate/n-butyl methacrylate/styrene; and (2-oxo-1,3-dioxolan-4-yl)-methyl methacrylate/n-butyl acrylate/t-butyl acrylate/methyl methacrylate/hydroxyethyl methacrylate.

The compounds (A) can be prepared according to the invention by copolymerization of the monomers according to (a) with those corresponding to (b). The monomers (a) carrying 1,3-dioxolan-2-one groups are preferably those of the formula (I), and they can be obtained by adding $CO_2$ to the corresponding glycidyl esters of unsaturated carboxylic acids such as (meth)acrylic acid, maleic acid, fumaric acid and the like. Processes of this type are described, for example, in PCT(WO) patent application No. 84/03,701 and in German Offenlegungsschriften Nos. 3,529,263 and 3,600,62. Their disclosure, including the preferred embodiments, is incorporated herein by reference.

The copolymerization is here carried out in the known manner, preferably by the free-radical chain mechanism and by the conventional methods of bulk polymerization, solution polymerization, precipitation polymerization, dispersion polymerization, emulsion polymerization or bead polymerization. Bulk polymerization, solution polymerization or emulsion polymerization are preferred. To initiate the polymerization, conventional free radical-forming initiators are used. Examples of suitable initiators are hydrogen peroxide, organic hydroperoxides and peroxides, such as di-tert.-butyl peroxide, caproyl peroxide, lauroyl peroxide, dibenzoyl peroxide, t-butyl perbenzoate, dicumyl peroxide, p-menthane hydroperoxide, tert.-butyl hydroperoxide, cumene hydroperoxide and succinic acid peroxide, and also aliphatic azo compounds which decompose into free radicals under polymerization conditions, such as 2,2-azo-bis-2,4-dimethylvaleronitrile, 2,2-azo-bis-isobutyronitrile and analogous azonitriles. The initiators are in general used in a quantity from 0.05 to 5% by weight, preferably 0.1 to 3.0% by weight, relative to the quantity of monomers. The optimum quantity and the initiator having the most appropriate activity can readily be determined by experiment.

The initiator can be gradually metered into together with the monomers. A part of the initiator can also be added in some cases to the substances initially introduced, for example in the case of bulk polymerization.

In certain cases, it can be desirable also to add other agents modifying the chain length (regulators) to the polymerization mixture, such as mercaptans, dimerized α-methylstyrene and the like. In general, 0.1 to 5.0% by weight, preferably 0.1 to 3.0% by weight, relative to the total quantity of monomers, of these compounds are used.

If the polymerization is carried out in solution, the usual organic solvents, inert under the polymerization conditions, can be used for this purpose, such as, for example, halogenated hydrocarbons, ethers such as diethyl ether, diethylene glycol dimethyl ether, tetrahydrofuran or dioxane, ketones such as, for example, methyl ethyl ketone, acetone, cyclohexanone and the like, esters such as butyl acetate, ethylglycol acetate, methylglycol acetate and methoxypropyl acetate, monohydric and polyhydric alcohols such as ethanol, isopropanol, sec.-butanol, tert.-butanol, diacetone alcohol, ethylene glycol, ethylene glycol monoethyl ether, ethylene glycol monobutyl ether, diethylene glycol, triethylene glycol, propylene glycol propylene glycol monomethyl ether and dipropylene glycol monomethyl ether, and aliphatic or aromatic hydrocarbons such as hexane, heptane, cyclohexane, benzene, xylene and toluene. The solvents can here be employed singly or as a mixture.

The copolymerization can be carried out within a wide temperature range from about 20° to 250° C., preferably 60 to 180° C., with reaction times from 4 to 16 hours, preferably up to 10 hours. Usually, normal pressure is applied here, but higher pressures can be of advantage in some cases.

The preparation of component (A) can also be carried out in such a way that suitable oligomers or polymers, which contain a sufficient number of randomly distributed glycidyl (epoxide) groups, for example polymers containing glycidyl methacrylate, which have been prepared by copolymerization as described above, are reacted in a known manner with $CO_2$ in the presence of a catalyst (cf. the literature references quoted above). In this case, all the glycidyl (epoxide) groups or only some of them are converted into 1,3-dioxolan-2-one groups.

As the compound (B) for the preparation of the reaction products according to the invention, polyamines can be used which preferably contain one primary amino group or two primary amino groups, for example those of the formula (II)

$$H_2N-(R_3NH)_m-R_4 \qquad (II),$$

in which m is zero or an integer from 1 to 6, preferably 1 to 4, $R_3$ is a divalent, non-aromatic hydrocarbon radical having 2 to 18 carbon atoms, preferably a branched or unbranched alkylene radical having 2 to 10 carbon atoms, especially 2 to 6 carbon atoms, or a cycloalkylene radical having 6 to 12 carbon atoms, preferably 6 to 10 carbon atoms, or an aralkylene radical having 8 to 12 carbon atoms, preferably 8 to 10 carbon atoms, and $R_4$ is H or

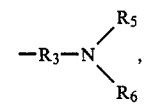

where $R_3$ is as defined above and $R_5$ and $R_6$ either are independently of one another H, $(C_1-C_{20})$-alkyl, preferably $(C_1-C_6)$-alkyl, hydroxy-$(C_1-C_{16})$- alkyl, preferably $$-CH_2-CH-R_6$$
$$\phantom{-CH_2-}OH$$

$R_6$=H, $(C_1-C_{12})$—alkyl, $-CH_2-O-(C_1-C_{12}-)$—alkyl, $-CH_2$-O-aryl, $$CH_2-O-\underset{O}{C}-(C_1-C_{12})\text{—alkyl or } CH_2-\underset{R_7}{CH}-CN$$

($R_7$=H or $(C_1-C_6)$-alkyl) or $R_5$ and $R_6$ are part of a 5-membered, 6-membered or 7-membered aliphatic ring with the proviso that, if m is zero, $R_4$ is other than H.

Examples of polyamines of the formula (II) are: ethylenediamine, propylenediamine, 2-methylpentamethylenediamine, hexamethylenediamine, octamethylenediamine, triacetonediamine, dioxadecanediamine, dioxadodecanediamine and higher homologues, cycloaliphatic diamines such as 1,4-cyclohexanediamine, 4,4-methylene-bis-cyclohexylamine, 4,4-isopropylene-bis-cyclohexylamine, isophoronediamine, m-xylylenediamine, N-methylethylenediamine, hydroxyethyl-amino-ethylamine and -propylamine, N-aminoethylpiperazine, N,N-dimethyl-ethylenediamine and -propylenediamine, N,N-dihydroxyethylethylenediamine and the like. Moreover, reaction products of diamines such as, for example, ethylenediamine, propylenediamine, hexamethylenediamine, trimethylhexamethylenediamine and m-xylylenediamine with terminal epoxides such as, for example, propylene oxide and hexene oxide or with glycidyl ethers such as phenyl glycidyl ether, ethylhexyl glycidyl ether and butyl glycidyl ether or with glycidyl esters such as "Cardura E", or with unsaturated compounds such as acrylonitrile or methacrylonitrile. The reaction must be carried out in such a way that only one of the two primary amino groups present is alkylated, that is to say is reacted with the said epoxides or unsaturated compounds.

For this purpose, the appropriate polyamino compound is used in excess. Of course, mixtures of the amines can also be used.

The molar ratio of the components (A) and (B) to one another can be varied within a wide range. If component (B) has one primary amino group per molecule, the ratio of carbonate groups in component (A) to primary amino groups in component (B) can be 0.5/1 to 1/0.5, especially 0.8/1 to 1/0.8. If component (B) has two primary amino groups per molecule, an excess of component (B) will be used in order to avoid crosslinking. The ratio of component (A) to component (B) can, for example, be 1:10, especially 1:3.

The reaction for preparing the reaction products according to the invention can be carried out in bulk or in the presence of a solvent or diluent which is inert, that is to say does not interfere with the reaction. The inert solvents used can in principle be the same as those which are suitable for the solution polymerization for preparing component (A) (see above), that is to say, for example, ethers such as, for example, diethyl ether, tetrahydrofuran, dioxane, 1,2-dimethoxyethane or diethylene glycol dimethyl ether, alcohols such as, for example, ethanol, butanol or ethylene glycol and cycloaliphatic or aromatic hydrocarbons such as hexane, heptane, toluene or xylene; solvents such as dimethylformamide and N-methylpyrrolidone are also very suitable. The reaction of components (A) and (B) is advantageously carried out in the temperature range from 0° to 150° C., preferably from 40° to 120° C. and especially from 60° to 120° C.

The acrylate resins according to the invention, which contain amino groups and the amine numbers of which are in general between 1 and 120, preferably 1 and 80 and especially 2 and 50 and the molecular weight of which $M_w$ is in most cases 1,000 to 50,000, preferably 3,000 to 30,000, represent valuable binders, in particular for paints and coatings, especially electrodip coatings, since they can be processed in aqueous systems after the basic groups have been protonated with organic acids. However, the acrylate resins according to the invention are also suitable as binders in conventional solvent-containing coating systems. In this case, they can be used as the sole binders, provided that they contain the functional groups required for crosslinking (so-called self-crosslinking one-component coatings).

On the other hand, however, it is also possible to add conventional curing agents, such as are used for non-autocrosslinking two-component coatings, to the reaction product according to the invention from components (A) and (B).

For cold-curing two-component coating systems, for example unblocked polyisocyanates can be used, such as the compounds known from polyurethane chemistry. The following may be mentioned here as suitable polyisocyanates: aliphatic, cycloaliphatic or aromatic polyisocyanates and the N=C=O-containing prepolymers obtainable from polyols and diisocyanates, as well as polyisocyanates containing urethane and/or biuret and/or isocyanurate groups. However, compounds containing epoxide groups, such as, for example, low-molecular polyepoxides, copolymers containing epoxide groups and di- or poly-glycidyl ethers of aliphatic or aromatic alcohols are also suitable as a curing component active at room temperature for these copolymers containing amino groups. In addition, oligomeric or polymeric compounds which contain at least two 1,3-dioxolan-2-one groups per molecule should also be mentioned here as curing components; these include, for example, the compounds (A). Finally, suitable compounds to be present which cure at room temperature are also compounds which contain double bonds suitable for a Michael addition (or nucleophilic addition), such as, for example, acrylic acid esters or amides of polyols or polyamides as well as acrylic acid esters of copolymers or polycondensates, such as are described, for example, in German Patent Applications P 3,508,399.9 and P 3,541,140.6.

For coating systems stable on storage at room temperature, partially or fully blocked polyisocyanates are preferably used, such as are obtained by reaction of the abovementioned polyisocyanates with the blocking agents known for this purpose (cf., for example, German Offenlegungsschrift 3,624,454). In addition, however, other suitable curing agents for coating systems stable on storage are β-hydroxy esters of at least bifunctional polycarboxylic acids, reaction products of dialkyl malonates with aldehydes and ketones which, with elimination of water, react to give unsaturated dicarboxylic acid esters (Knoevenagel synthesis), transesterifying curing agents and Michael addition products, for example as described in German Offenlegungsschriften Nos. 3,315,469, 3,417,441 and 3,436,345, to which reference is made here.

After the application, which can be carried out by the conventional methods such as electrodip coating, spraying, dipping and the like, the coating is cured, depending on nature of the curing component, at room temperature or at elevated temperatures by conventional methods, temperatures from 10° to 220° C., preferably 20° to 180° C., being used.

In order to obtain aqueous formulations, it is advantageous to neutralize the basic amino groups partially or fully, in order thus to obtain coating compositions which can be electro-deposited from aqueous solution at above pH between about 3 and 9. The neutralization of the basic groups is in general carried out with water-soluble acids, for example formic acid, acetic acid, lactic acid or phosphoric acid. The quantity of acid depends in an individual case on the properties of the resin used and is in general only taken to a stage where the resin is solubilized or dispersed. The electro-deposition of the coating particles is effected by known methods, to which reference is made here. The deposition can be made on any electrically conductive substrate, for example metal, such as steel, copper, aluminum and the like.

Aqueous formulations which have a particularly low content of volatile organic solvents are obtained, for example, by distilling off the solvents contained in the binders from the preparation or dissolution. This process step is preferably carried out under a reduced pressure.

If appropriate, various additives such as solvents, pigments, pigment pastes, antioxidants, surfactants, leveling agents and thickeners, reactive diluents, catalysts and the like can also be added to the coating formulations. These additives are known and are conventionally used in the coating industry.

The cured products obtainable by means of the reaction products (binders) according to the invention are distinguished above all by the following properties: good solvent resistance; good weathering resistance and light stability (low yellowing tendency); good adhesive strength on substrates; low curing temperatures; good mechanical properties such as high values of the (pendulum) hardness even after short curing times.

The invention is explained in more detail by the examples which follow. In these, T means parts by weight and ./. means per cent by weight.

EXAMPLES (I) Preparation of the reaction product according to the invention

EXAMPLE I.1

150 parts of diglycol dimethyl ether are initially introduced into a reaction flask fitted with a stirrer, reflux condenser and internal thermometer and are heated to 140° C.

In the course of 6 hours, a mixture composed of 169 parts of (2-oxo-1,3-dioxolan-4-yl)-methyl methacrylate, 315 parts of 2-hydroxyethyl methacrylate, 286 parts of n-butyl methacrylate, 172 parts of butyl acrylate, 108 parts of 2-ethylhexyl acrylate, 12 parts of di-t-butyl peroxide and 10 parts of dodecylmercaptan was metered in at the same temperature. The polymerization was then continued for one hour, and the batch was diluted with 355 parts of diglycol dimethyl ether. In the course of one hour, 107 parts of 2-hydroxyethyl-1,3-propanediamine were then metered in at 80° C. and stirring was continued until an amine number of 33 was reached. This gave a clear resin solution of 70% solids content.

EXAMPLE I.2

The procedure followed was as in Example I.1, but with the difference that 79 parts of N-methylpropanediamine were used as the amine and stirring was continued until an amine number of 31 was reached. This gave a clear resin solution of 69% solids content.

EXAMPLE I.3

150 parts of diglycol dimethyl ether were initially introduced into a reaction flask fitted with a stirrer, reflux condenser and internal thermometer and were heated to 155° C. In the course of 6 hours, a mixture composed of 169 parts (2-oxo-1,3-dioxolan-4-yl)-methyl methacrylate, 315 parts of 2-hydroxyethyl methacrylate, 256 parts of n-butyl methacrylate, 142 parts of butyl acrylate, 108 parts of 2-ethylhexyl acrylate, 60 parts of styrene, 12 parts of di-t-butyl peroxide and 10 parts of dodecylmercaptan was metered in at the same temperature. The polymerization was then continued for one hour, and the batch was diluted with 350 parts of diglycol dimethyl ether. In the course of one further hour, 107 parts of 2-hydroxyethyl-1,3-propanediamine were then metered in at 80° C. and stirring was continued until an amine number of 33 was reached. This gave a clear resin solution of 70.5% solids content.

EXAMPLE I.4

The procedure followed was as in Example I.3, but with the difference that 79 parts of N-methylpropanediamine were used as the amine and stirring was continued until an amine number of 31 was reached. This gave a clear resin solution of 69% solids content.

EXAMPLE I.5

150 parts of diglycol dimethyl ether and 2 parts of di-t-butyl peroxide were initially introduced into a reaction flask fitted with a stirrer, reflux condenser and internal thermometer and were heated to the boiling point. In the course of 6 hours, a mixture composed of 149 parts of (2-Oxo-1,3-dioxolan-4-yl)-methyl methacrylate, 315 parts of 2-hydroxyethyl methacrylate, 296 parts of n-butyl methacrylate, 182 parts of butyl acrylate, 108 parts of 2-ethylhexyl acrylate, 10 parts of di-t-butyl peroxide and 12 parts of dodecylmercaptan was metered in at the same temperature. The polymerization was then continued for one hour, and the batch was diluted with 345 parts of diglycol dimethyl ether. In the course of one further hour, 94 parts of 2-hydroxyethyl-1,3-propanediamine were then metered in at 80° C., and stirring was continued until an amine number of 29 was reached. This gave a clear resin solution of 70% solids content.

EXAMPLE I.6

The procedure followed was as in Example I.5, with the difference that 70 parts of N-methylpropanediamine were used as the amine and stirring was continued until an amine number of 28 was reached. This gave a clear resin solution of 69% solids content.

EXAMPLE I.7

(self-crosslinking)

A solution of 124 parts of ε-caprolactam in 150 parts of diglycol dimethyl ether was added at 50° C. in the course of 2 hours to 222 parts of isophorone diisocyanate and 0.5 part of ziOc acetylacetonate. Stirring was then continued at the same temperature until an isocyanate content of 7.6% was reached.

A resin solution prepared as described in Example I.1 and composed of 300 parts of diglycol dimethyl ether, 186 parts of (2-oxo-1,3-dioxolan-4-yl)-methyl methacrylate, 166 parts of butyl acrylate, 190 parts of butyl methacrylate, 143 parts of hydroxyethyl methacrylate, 8 parts of di-tert.-butyl perbenzoate and 6 parts of dodecylmercaptan was then metered in at the same temperature in the course of 2 hours, and stirring was continued until a free isocyanate content of <0.1% was reached. In the course of one further hour, 87 parts of N-methyl 1,3propanediamine were then metered in and stirring was continued until an amine number of 35 was reached. This gave a clear solution of 72% solids content.

EXAMPLE I.8

100 parts of xylene were initially introduced into a reaction flask fitted with a stirrer, reflux condenser and internal thermometer and heated to the boiling point. In the course of 6 hours, a mixture composed of 55 parts of (2-oxo-1,3-dioxolan-4-yl)-methyl methacrylate, 200 parts of methyl methacrylate, 70 parts of 2-ethylhexyl acrylate, 175 parts of styrene, 4 parts of di-t-butyl peroxide and 5 parts of dodecylmercaptan were metered in at the same temperature. The polymerization was then continued for one hour and the batch was diluted with 100 parts of xylene. In the course of one further hour, 234 parts of trimethylhexamethylenediamine were then metered in at 80° C. After stirring for 3 hours at 80° C., the solvent and the excess amine were distilled off at 120° C. in an oil pump vacuum. The residue was taken up in a mixture of 100 parts of n-butyl acetate. This gave a clear resin solution of 72% solids content and an amine number of 25.

EXAMPLE I.9

100 parts of diglycol dimethyl ether were initially introduced into a reaction flask fitted with a stirrer, reflux condenser and internal thermometer and heated to the boiling point. In the course of 6 hours, a mixture composed of 166 parts of (2-oxo-1,3-dioxolan-4-yl)-methyl methacrylate, 94.5 parts of n-butyl methacrylate, 89.5 parts of butyl acrylate, 150 parts of styrene, 4 parts of di-t-butyl peroxide and 5 parts of dodecylmercaptan was metered in at the same temperature. The polymerization was then continued for one hour, and the batch was diluted with 240 parts of diglycol dimethyl ether. In the course of one further hour, 268 parts of ethylenediamine were then metered in at 80° C. and stirring was continued for 3 hours. The solvent and the excess amine were then distilled off in vacuo. The residue was taken up in 400 parts of methoxypropanol. This gave a clear resin solution of 57% solids content and an amine number of 54.

EXAMPLE I.10

240 parts of n-butylglycol and 2 parts of di-t-butyl peroxide were initially introduced into a reaction flask fitted with a stirrer, reflux condenser and internal thermometer and heated to 140° C. In the course of 6 hours, a mixture composed of 136 parts of (2-oxo-1,3-dioxolan-4-yl)-methyl methacrylate, 288 parts of 2-hydroxyethyl methacrylate, 244 parts of a methacrylate of an alcohol having predominantly 13 carbon atoms, 139 parts of butyl acrylate, 98 parts of 2-ethylhexyl acrylate, 55 parts of styrene, 10 parts of di-t-butyl peroxide and 12 parts of dodecylmercaptan was metered in at the same temperature. The polymerization was then continued for one hour and the solvent was distilled off. After dilution with 440 parts of methoxypropanol, 86 parts of 2-hydroxyethyl-1,3-propanediamine were then metered in at 80° C. in the course of one further hour and stirring was continued until an amine number of 28 was reached. This gave a clear resin solution of 70.5% solids content.

EXAMPLE I.11

The procedure followed was as in Example I.10, but with the difference that 64 parts of N-methyl-1,3-propanediamine were used as the amine. This gave a clear resin solution of 72% solids content and an amine number of 29.

(II) Preparation of the curing agent

EXAMPLE II.1

666 parts of isophorone diisocyanate, 0.7 part of zinc acetylacetonate and 486 parts of diglycoldimethyl ether were heated to 50° C. in a stirring apparatus fitted with a reflux condenser and internal thermometer, and 127.3 parts of trimethylolpropane were added in portions. Stirring was continued until an isocyanate content of 10.3% had been reached. 285 parts of ε-caprolactam were then added in portions at 50° C. After an isocyanate content of 2% had been reached, 56 parts of dimethylaminoethanol were added dropwise at room temperature, and stirring was then continued until a free isocyanate content of <0.2% was reached. This gave a clear colorless resin solution of 70% solids content.

EXAMPLE II.2

A curing component composed of 666 parts of isophorone diisocyanate, 127.3 parts of trimethylolpropane, 493 parts of diglycol dimethyl ether and 356 parts of ε-caprolactam was prepared as described in Example II.1. The curing agent had a solids content of 70%.

(III) Application Examples

General preparation instructions for an electrodip coating

The copolymer containing amino groups was mixed with the curing agent and dibutyl-tin dilaurate as a catalyst. With intensive stirring, the mixture was then neutralized with formic acid and slowly diluted with deionized water. The aqueous clear coat thus obtained was deposited after stirring for one day at 25° C. The results obtained are summarized in Table 1.

TABLE 1

| Dip coat No. | 1 | 2 | 3 | 4 |
|---|---|---|---|---|
| Copolymer I.1 | 300 | — | — | — |
| Copolymer I.2 | — | 150 | — | — |
| Copolymer I.10 | — | — | 180 | — |
| Copolymer I.11 | — | — | — | 210 |
| Curing agent II.1 | 125 | — | — | 92 |
| Curing agent II.2 | — | 64 | 75 | — |
| Dibutyl-tin dilaurate | 10.5 | 5.1 | 6.3 | 7.6 |
| Formic acid (10%) | 68 | 31 | 37 | 49 |
| deionized water | 1700 | 810 | 1130 | 1240 |
| Solids content [% by weight] | about 15 | about 16 | about 14 | about 15 |
| MEQ value | about 50 | about 45 | about 45 | about 50 |
| pH value | 5.8 | 6.0 | 6.1 | 6.0 |
| Bath conductivity [μscm$^{-1}$] | 1430 | 1140 | 1700 | 1620 |
| Deposition voltage [V] | 100 | 100 | 150 | 150 |
| Baking conditions ([°C.]/[minute]) | 170/20 | 180/15 | 160/30 | 170/30 |
| Film thickness [μm] | 12 | 15 | 14 | 17 |

Smooth films having perfect surfaces, which did not show any yellowing, were produced in all cases.

We claim:

1. A non-crosslinked reaction product of a compound (A) derived from ethylenically unsaturated monomers which contains in random distribution structural units (a) carrying 1,3-dioxolan-2-one groups of the formula I

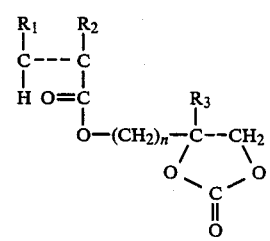

in which n is a number from 1 to 6, $R_1$ is H, alkyl or COOR" (R"=alkyl), and $R_2$ is, independently thereof, H or alkyl and $R_3$ is H, methyl or ethyl and a compound (B) having at least one primary aliphatic or cycloaliphatic amino group and additionally, at least one further basic amino group, the amine numbers of the reaction product being between 1 and 120 and the molecular weight Mw is 1,000 to 50,000.

2. A non-crosslinked reaction product as claimed in claim 1, wherein the compound (A) also contains, in addition to the structural units (a) carrying the 1,3-dioxolan-2-one groups, structural units (b) which are derived from at least one of the monomers from the group comprising (b1) olefins, (b2) vinyl aromatic monomers, (b3) esters, containing hydroxyl groups or glycidyl groups, of unsaturated mono- or di-carboxylic acids, (b4) esters, amides or nitriles of unsaturated mono- or di-carboxylic acids, (b5) polymerizable esters of unsaturated monocarboxylic acids, (b6) vinyl ethers and (b7) monomers having blocked isocyanate groups.

3. A non-crosslinked reaction product as claimed in claim 2, wherein (b2) is styrene, (b3) is hydroxyethyl (meth)acrylate, (b4) is methyl (meth)acrylate, butyl (meth)acrylate or 2-ethylhexyl (meth)acrylate, (b5) is vinyl acetate or the vinyl ester of versatic acid and (b7) is a vinyl urethane.

4. A non-crosslinked reaction product as claimed in claim 1, wherein the compound (A) is one of the following copolymers:
(2-oxo-1,3-dioxolan-4-yl)-methyl (meth)acrylate/2-hydroxyethyl (meth)acrylate/butyl (meth)acrylate/ethylhexyl (meth)acrylate;
(2-oxo-1,3-dioxolan-4-yl)methyl (meth)acrylate/2-hydroxyethyl (meth)acrylate/butyl (meth)acrylate/ethylhexyl (meth)acrylate/styrene;
4-(2-oxo-1,3-dioxolan-4-yl)-methyl itaconate/2-hydroxyethyl (meth)acrylate/butyl (meth)acrylate/ethylhexyl (meth)acrylate;
4-(2-oxo-1,3-dioxolan-4-yl)-methyl itaconate/2-hydroxyethyl (meth)acrylate/butyl (meth)acrylate/ethylhexyl (meth)acrylate/styrene;
(2-oxo-1,3-dioxolan-4-yl)-methyl maleate/2-hydroxyethyl (meth)acrylate/butyl (meth)acrylate/ethylhexyl (meth)acrylate.

5. A non-crosslinked reaction product as claimed in claim 1, wherein compound (A) is composed of 5 to 80% by weight of structural units (a) and 95 to 20% by weight of structural units (b), each relative to (A).

6. A non-crosslinked reaction product as claimed in claim 1, wherein compound (A) additionally also contains structural units (c) which carry blocked isocyanate groups.

7. A non-crosslinked reaction product as claimed in claim 1, wherein the compound (B) is a compound of the formula (II)

$$H_2N-(R_3NH)_m-R_4 \qquad (II)$$

in which m and n are zero or an integer from 1 to 6, $R_3$ is a divalent, non-aromatic hydrocarbon radical having 2 to 18 carbon atoms and $R_4$ is H or

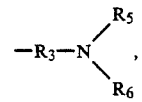

where $R_3$ is defined above, and $R_5$ and $R_6$ either are, independently of one another, H, $(C_1-C_{20})$-alkyl, hydroxy$(C_1-C_{16})$-alkyl, preferably

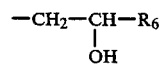

($R_6$=H, $(C_1-C_{12})$-alkyl, $-CH_2-O-(C_1-C_{12})$-alkyl, $-CH_2-O-$aryl,

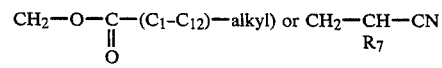

($R_7$=H or $(C_1-C_6)$-alkyl) or $R_5$ and $R_6$ are part of a 5-membered, 6-membered or 7-membered aliphatic ring, with the proviso that, if m is zero, $R_4$ is other than H.

8. A non-crosslinked reaction product as claimed in claim 7, wherein m in the formula (II) is zero, $R_3$ is an alkylene radical having 2 to 10 carbon atoms and $R_5/R_6$ are each H.

9. A coating containing a non-crosslinked reaction product of claim 1.

10. The coating of claim 9 which is an electrodip coating.

11. The coating of claim 9 in which is a two-component coating curing at room temperature.

* * * * *